United States Patent [19]
Berken et al.

[11] Patent Number: 5,917,885
[45] Date of Patent: Jun. 29, 1999

[54] METHOD AND SYSTEM FOR TESTING SUBSCRIBER CIRCUITS AND WIRING IN A CABLE COMMUNICATION SYSTEM

[75] Inventors: James J. Berken, Lombard; Andrew J. Mansen, Barrington; David A. Green, Bartlett; Phillip K. Freyman, Elgin, all of Ill.

[73] Assignee: Motorola, Inc., Schaumburg, Ill.

[21] Appl. No.: 08/829,760

[22] Filed: Mar. 31, 1997

[51] Int. Cl.$^6$ ............................. H04M 1/24; G01R 31/11
[52] U.S. Cl. .............................. 379/26; 379/30; 379/6; 324/534
[58] Field of Search .................. 379/5, 6, 22–30, 379/32; 324/533, 534, 532, 527, 535, 539

[56] References Cited

U.S. PATENT DOCUMENTS

| | | | |
|---|---|---|---|
| 5,083,086 | 1/1992 | Steiner | 324/534 |
| 5,121,420 | 6/1992 | Marr et al. | 379/26 |
| 5,633,909 | 5/1997 | Fitch | 379/6 |
| 5,649,304 | 7/1997 | Cabot | 379/6 |

*Primary Examiner*—Paul Loomis
*Attorney, Agent, or Firm*—Thomas G. Berry

[57] ABSTRACT

A line interface circuit (120) receives an audio signal from a signal generator (132). A reflected signal is produced at the output port (216) of a SLIC (210). The reflected signal is combined with the received audio signal to produce a combined audio signal. The combined audio signal is measured to determine if a fault exists in the subscriber loop (130).

31 Claims, 8 Drawing Sheets

METHOD AND SYSTEM FOR TESTING SUBSCRIBER CIRCUITS AND WIRING IN A CABLE COMMUNICATION SYSTEM

BACKGROUND

The present invention relates, in general, to telephony communication and, specifically, to subscriber loop testing.

Telephone service is becoming available to the subscriber premise through a variety of systems. Telephone systems have been implemented using fiber optic cable, digital loop carrier, wireless local loop, telephony over cable television and other systems. It is often necessary to test different portions of the these systems including the subscriber loop interface circuit (SLIC), the subscriber wiring and the connections between a central office or head-end and a subscriber premise.

Conventional telephone systems use testing equipment at the central office to perform some of these tests. The test equipment is relatively expensive, large and complicated. In conventional systems, the test equipment is connected to a particular subscriber loop when the subscriber loop is tested. In systems where the subscriber premise is connected to the central office through only twisted pair wiring, the test equipment at the central office can be used to test any of the subscriber loops connected to the particular central office.

Since the test equipment in conventional systems requires twisted pair wiring from the central office to the subscriber premise, other testing methods must be used when the communication systems utilizes transmission media other than twisted pair for part or all of the communication path.

One method of testing these systems includes moving the conventional test equipment to the furthest point from the subscriber premise that is connected to the subscriber premise only through twisted pair wires. For example, in some "fiber to the curb" communication systems, testing equipment is installed at the transition point from fiber optic cable to twisted pair wiring. However, this solution requires multiple sets of testing equipment for each central office since each set of testing equipment can only test a subset of the total subscriber loops serviced by the central office. The cost of implementing such a test system becomes significant as the number of subscriber loop subsets serviced by a central office increases and, therefore, the number of test equipment sets increases.

In telephony over cable and other communication systems that use a communication media other than twisted pair wiring to the subscriber premise, installing conventional test equipment at the subscriber premise is cost prohibitive.

In addition, the test results obtained by test equipment at any point between the central office or head-end and the subscriber premise must be transmitted to the central office or head-end in order for corrective action to be taken.

Another solution is to manually test the subscriber loop by sending a repair person to the location of the subscriber loop. However, this is time consuming and expensive.

Therefore, there exists a need for an inexpensive and efficient method and system for testing subscriber loop circuits and subscriber wiring in telephone communication systems.

DETAILED DESCRIPTION OF THE PREFERRED EMBODIMENT

The present invention provides a method and apparatus for testing a subscriber loop including a subscriber premise network and line interface circuitry.

A line interface circuit that includes at least a subscriber loop interface circuit (SLIC) and a combiner circuit receives an audio signal from a signal generator. The SLIC translates the received audio signal to a tip-ring port of the SLIC and produces a reflected audio signal at an output of the SLIC. The reflected audio signal and the received audio signal are combined to produce a combined audio signal. A signal analyzer measures the combined audio signal to determine if a fault exists in the subscriber loop that includes the subscriber premise network and the line interface circuit.

The line interface circuit is tested separately by substituting a complex load for the subscriber premise network and measuring the combined audio signal.

Additional fault information is acquired by attenuating the received audio signal before it is combined with the reflected audio signal.

By using the method and system of the present invention, a subscriber loop can be tested efficiently, quickly and inexpensively.

Figure 1:
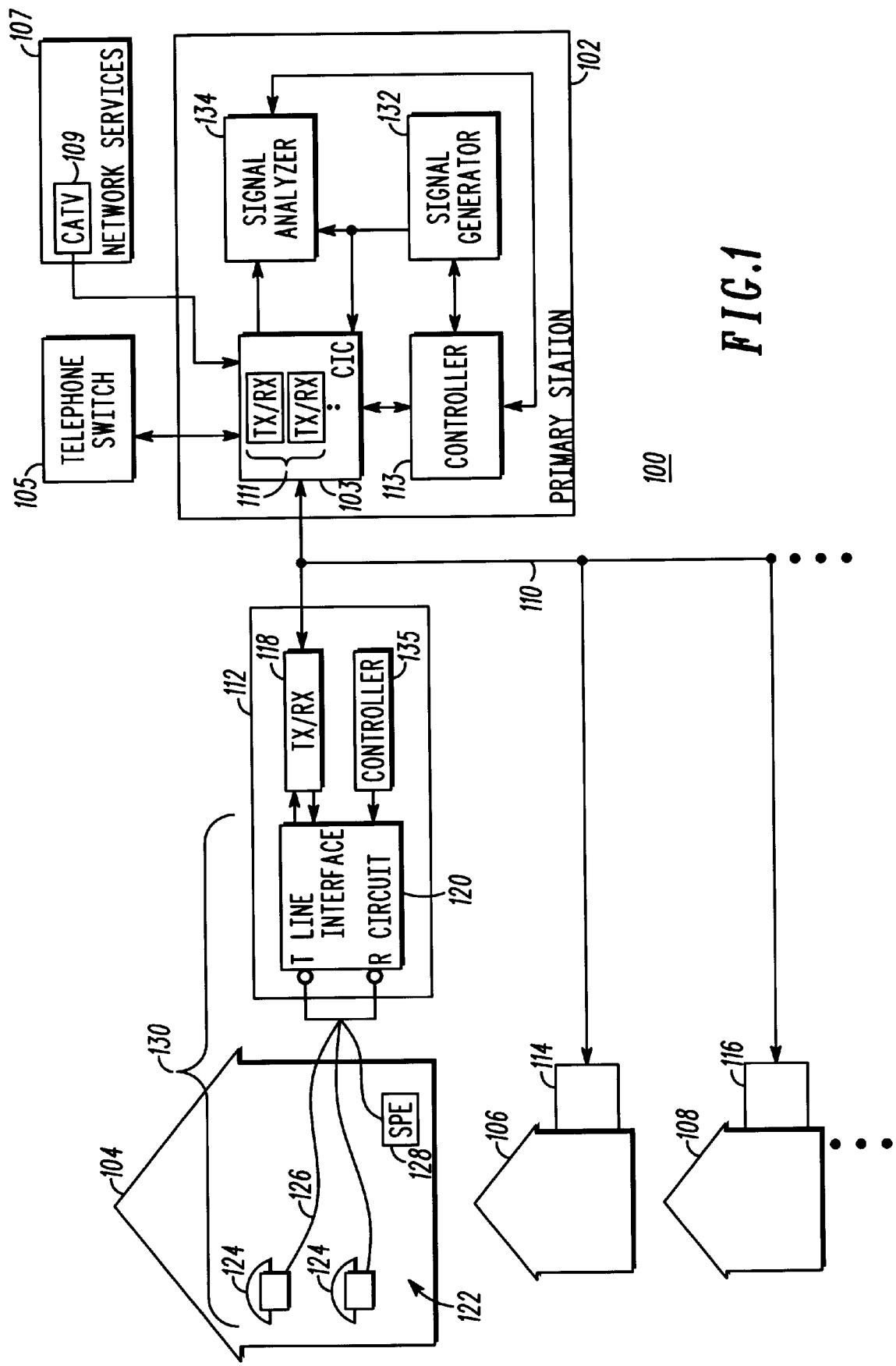
FIG. 1 is a block diagram of a cable telephony communication system suitable for employing an embodiment in accordance with the invention.

FIG. 1 is a block diagram of a cable telephony communication system 100 suitable for employing an embodiment in accordance with the invention. A primary station 102 provides telephone and other network services such as cable television to a plurality of subscriber premises 104–108 through a hybrid fiber/coaxial cable network 110. Cable access units (CAUs) 112–116 communicate with the primary station 102 through a cable interface circuit (CIC) 103 in the primary station 102 over the cable network 110 using, preferably, time division multiplexing (TDM) techniques. The primary station 102 is coupled to a telephone switch 105 and to other network services 107 such as cable television 109. A transceiver 118 in the CAU 112 transmits and receives digital signals containing communication information such as audio voice telephone signals, video telephone signals and communication control signals to and from the CIC 103. Transceivers 111 in the CIC 103 transmit audio and video telephone information in addition to control signals generated in the controller 113 and receive signal transmitted by the CAU 112. The CAU 112 receives cable television (CATV) signals using standard downstream CATV carriers in 6 MHz wide channels and couples the CATV signals to televisions and other video devices in the subscriber premise 104.

The line interface circuit 120 and the subscriber premise network 122 define a subscriber loop 130. Incoming telephony signals from the telephone switch 105 are received by the primary station 102 and are converted into the appropriate format for transmission over the hybrid fiber/coaxial cable network 110. Telephony signals are received by the transceiver 118 from the cable control unit 103, demodulated and converted to voice signals. The voice signals are coupled through the line interface circuit 120 to the subscriber premise network 122. The subscriber premise network 122 includes any number of subscriber premise equipment 128 such as telephones 124, facsimile machines or modems connected to the line interface circuit 120 through one or more sections of twisted pair wiring 126. The subscriber premise network 122 may also include other communication links such as radio frequency connections.

Outgoing telephony voice signals are coupled to the transceiver 118 through the line interface circuit 120. The transceiver 118 converts the voice signals to digital signals that are transmitted to the CIC 103. The CIC 103 converts the digital signals to the appropriate format and transmits the resulting formatted signals to the telephone switch 105.

In the preferred embodiment of the invention, a signal generator 132 and signal analyzer 134 are located at the primary station 102. Digital signal processors or other digital circuitry within the primary station 102 are designed and programmed to perform the functions of the signal generator 132 and the signal analyzer 134. Circuitry independent of the primary station 102 may be used to perform the functions. Using independent circuitry is particularly useful in communication systems (100) where the signal generator 132 and the signal analyzer 134 are located in a location other than the primary station 102. The circuitry may be located anywhere along the communication path between the telephone switch 105 and the line interface circuit 120, depending on the particular communication system 100.

The signal generator 132 is designed using known digital signal processing techniques to generate a sinusoidal test audio signal. The signal analyzer 134 is designed using known digital signal processing techniques to compare the test audio signal to a digital signal received through the CIC 103.

A controller 135 in the CAU 112 receives control signals from the controller 113 through the transceiver 118. The controller 135 controls the line interface circuit 120 as described below. In the preferred embodiment, the controller 135 is a microprocessor designed using known techniques.

The controller 113 is, preferably, a microprocessor that sends and receives control signals to and from the CIC 103, signal analyzer 134, and signal generator 132 to perform the subscriber loop tests.

When the subscriber loop 130 is tested, the signal generator 132 generates the test audio signal, such as a 1 kHz sinusoidal tone. The test audio signal is coupled to the CIC 103 and transmitted to the CAU 112. The transceiver 118 converts the digital test audio signal to an analog audio signal producing a received audio signal. The received audio signal is coupled to the line interface circuit 120. The line interface circuit 120 produces a combined audio signal by combining the received audio signal and a reflected audio signal. As will be discussed below, in a wiring test, the reflected audio signal is dependent on an impedance at a tip-ring port of the line interface circuit 120. The reflected audio signal also depends on the impedance and the condition of the line interface circuit 120.

The combined audio signal is converted to a digital combined audio signal in the transceiver 118 and transmitted over the hybrid fiber/coaxial cable network 110 to the primary station 102. A signal analyzer 134 connected to the CIC 103 measures the digital combined audio signal and determines if a fault exists in the subscriber loop as will be discussed in more detail below.

Figure 2:
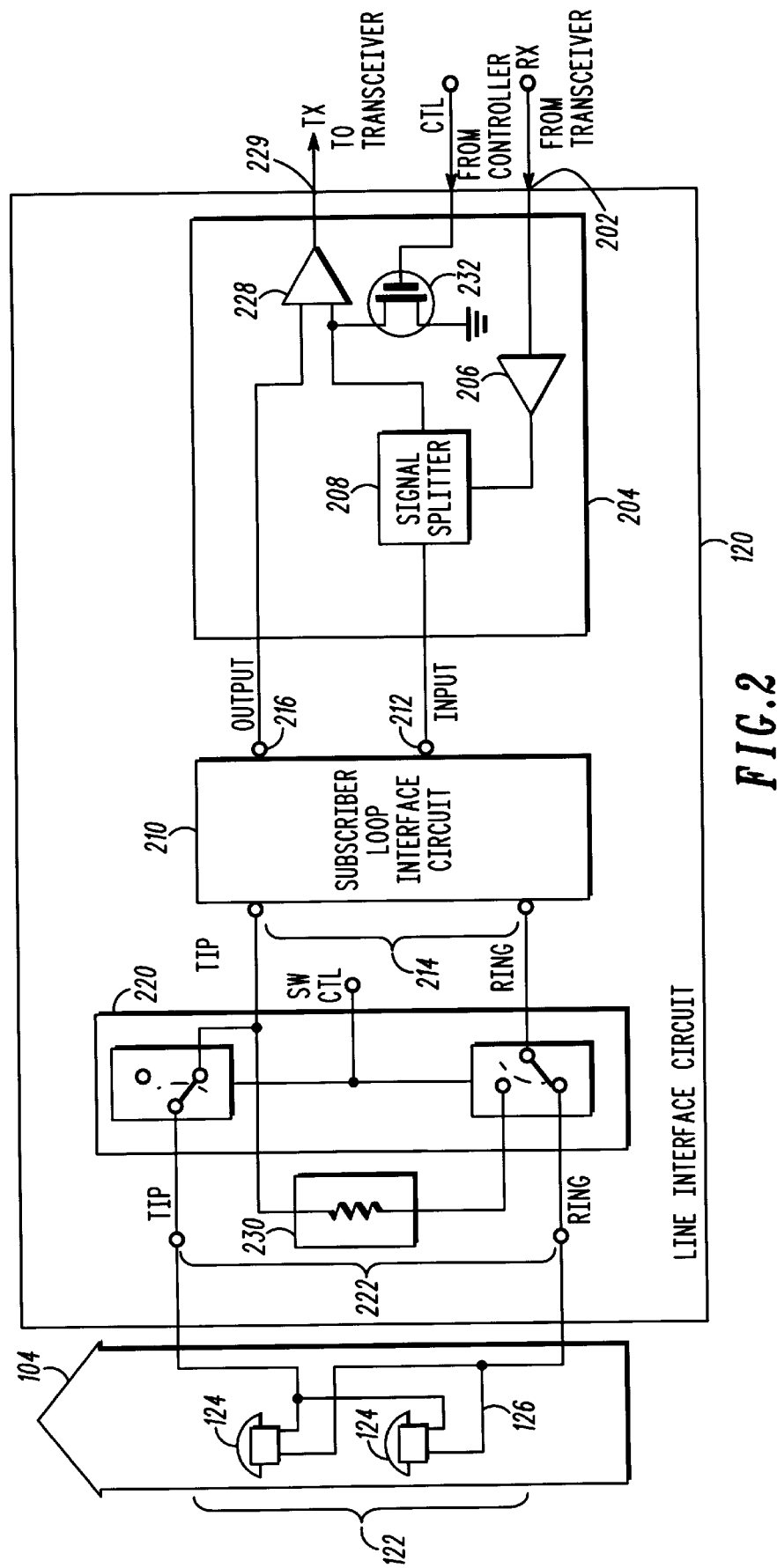
FIG. 2 is a block diagram of a line interface circuit in accordance with the preferred embodiment of the invention.

FIG. 2 is a block diagram of a line interface circuit 120 in accordance with the preferred embodiment of the invention. The line interface circuit 120 receives the received audio signal at the receive port 202 from the transceiver 118. The received audio signal passes through a gain adjuster 206 and through a signal splitter 208 where the received audio signal is coupled to a subscriber loop interface circuit (SLIC) 210 as well as a signal combiner 228. The signal splitter 208 is, preferably, a resistor network. The received audio signal is coupled to the (SLIC) 210 through an input port 212. The SLIC 210 is any one of several commercially available SLICs that convert a 4 wire interface to a two wire interface as known. The received audio signal is translated to the tip-ring port 214 of the SLIC 210.

The tip-ring port 214 of the SLIC 210 is coupled, through an interface switch 220, to a premise tip-ring port 222. The following discussion assumes unity gain between the receive port 202 and the premise tip-ring port 222. However, the gain depends on the particular design of the SLIC 210, combiner circuit 204, and the communication system 100 and may have a value other than one.

A reflected audio signal is produced at an output port 216 of the SLIC 210. If the SLIC 210 is operating properly, the reflected audio signal is dependent on an impedance at the tip-ring port 214 of the SLIC 210 and the received audio signal.

The reflected audio signal is coupled from the output port 216 to the combiner circuit 204. The signal combiner 228 in the combiner circuit 204 combines the received audio signal with the reflected audio signal to produce a combined audio signal at a transmit port 229 of the line interface circuit 120. Although the signals may be combined in various ways, the signal combiner 228 includes, preferably, an operational amplifier that subtracts the reflected audio signal from the received audio signal to produce the combined audio signal. As those skilled in the art will observe, the arrangement of the SLIC 210 and the combiner circuit 204 allows for utilizing the existing circuitry of the line interface circuit 120 used for voice communication for testing the subscriber loop. The combined audio signal is sent to the signal analyzer 134 as discussed above.

By transmitting and receiving an audio signal as described above, the primary station 102 performs a wiring test that will be discussed in more detail below. Signal analysis in the various tests will be discussed after description of the individual tests.

A combiner circuit test is performed by substituting a complex load 230 for the subscriber premise network 122. Preferably, a control signal sent to the interface switch 220 from the controller 135 directs two relays in the interface switch 220 to connect the complex load 230 to the tip-ring port 214. Preferably, the complex load 230 has an impedance that is similar to the impedance of the subscriber premise network 122 when one of the telephones 124 is off-hook. For example, the impedance of the subscriber premise network 122 when operating properly, with one of the telephones 124 in the network off-hook, is 600 ohms resistive. The complex load 230 is designed to be 600 ohms resistive.

In a SLIC test, the received audio signal is significantly attenuated before being combined with the reflected audio signal by a signal attenuator 232 and the complex load 230 is substituted for the subscriber premise network 122. In the preferred embodiment, the signal attenuator 232 is a transistor that operates as a switch that shorts to ground the input of the signal combiner 228 that receives the received audio signal. The signal attenuator 232 is controlled by the controller 135. Preferably, a logic "high" signal is sent by the controller 135 to turn on the signal attenuator 232 when it is desired to attenuate the received audio signal before it is coupled to the signal combiner 228.

In the preferred embodiment, the signal analyzer 134 in the primary station 102 analyzes the digital combined audio signal produced in the tests described above. Although the tests may be performed in varying order, the signal analyzer 134 performs the SLIC test first in the preferred embodiment.

The signal analyzer 134 measures the digital combined audio signal to determine if the SLIC 210 is operating properly. If the SLIC 210 is operating properly and the complex load 230 remains connected to the tip-ring port 214, the amplitude of the reflected audio signal is equal to the amplitude of the received audio signal.

In the SLIC test mode the signal attenuator 232 is turned on and shorts to ground the port of the signal combiner 228 receiving the received audio signal. The reflected audio signal is subtracted from ground potential and, therefore, is inverted to produce the combined audio signal. The combined audio signal is converted to the digital signal and transmitted to the primary station 102 as discussed above. The signal analyzer 134 measures the digital combined audio signal.

The received audio signal and the test audio signal generated by the signal generator 132 have the same amplitude. Preferably, the generated test audio signal has an amplitude of 0 dBm in each of the tests. Therefore, if the combined audio signal is approximately 0 dBm, the SLIC is operating properly.

Alternatively, the digital combined audio signal can be measured by comparing the amplitude to the test audio signal rather than taking an absolute measurement.

Once the signal analyzer 134 determines that the SLIC is operating properly, a phase initialization procedure is performed. Since it is known that the combined audio signal is inverted compared to the test audio signal, the signal analyzer 134 measures the phase between the combined audio signal and the test audio signal, defines the resulting phase as 180 degrees, and stores a phase offset value based on the difference between the measured phase and 180 degrees. When performing any phase measurements on the combined audio signal, the signal analyzer 134 compensates for the phase difference by subtracting the stored phase offset value.

If the SLIC 210 is operating properly, the signal analyzer 134 performs the combiner circuit test. The complex load 230 remains connected at the tip-ring port 214 and the signal attenuator is turned off. The reflected audio signal is combined with the received audio signal in the signal combiner 228. After passing through the gain adjuster 206 and the signal splitter 208, the received audio signal is approximately the same amplitude as the reflected audio signal. The combined audio signal is the difference between two similar signals and is, therefore, a very small signal. The signal analyzer 134 determines if a fault exists in the combiner circuit 204 by measuring the digital combined audio signal to determine if it below a predetermined threshold. For example, if the digital combined audio signal is more than 40 dB less than the test audio signal, the signal analyzer 134 determines that the combiner circuit 204 is operating properly and no fault exists in the SLIC 210 or the combiner circuit 204. Otherwise, the signal analyzer 134 determines that the SLIC 210 or the combiner circuit 204 has malfunctioned.

A wiring test is performed after the signal analyzer 134 determines that there are no faults in the line interface circuit. Two of the most common faults possible in the subscriber premise network 122 include a tip-ring short (short circuit across the premise tip-ring port 222) and a tip-ring open (open circuit across the premise tip-ring port 222 when the telephone 124 is off-hook). Test results differ depending on whether the telephone 124 is on-hook or off-hook.

In the wiring test, the subscriber premise network 122 is connected the tip-ring port 214 as in normal communication mode. The reflected signal is zero volts (no signal) when there are no shorts in the subscriber premise network 122 and the telephones 124 are on-hook. The signal combiner 228 subtracts the reflected audio signal from the received audio signal to produce combined audio signal. Since the reflected audio signal is zero volts, the combined audio signal is equivalent to the received audio signal. Therefore, the combined audio signal in the wiring test has an amplitude of 0 dBm and a phase of 0 degrees compared to the test audio signal if there are no shorts in the subscriber premise network 122 and the telephone 124 is on-hook. The signal analyzer 134 determines if the amplitude of the digital combined audio signal is within a predetermined range. If the amplitude is within the predetermined range the signal analyzer 134 determines if the phase of the digital combined audio signal with respect to the test audio signal is within a predetermined range. If the phase and the amplitude are within the respective predetermined ranges the signal analyzer 134 determines that a tip-ring short circuit does not exist within the subscriber premise network 122. For example, if the amplitude of the combined audio signal is between 0.2 and −0.2 dBm and the phase of the combined audio signal with respect to the test audio signal is between −10 degrees and 10 degrees, the signal analyzer 134 determines that no tip-ring shorts exist in the subscriber premise network 122.

If a tip-ring short exists, the reflected audio signal has an amplitude of 6 dBm and phase of 0 degrees with respect to the test audio signal. Therefore, if a tip ring short exists the combined audio signal has amplitude of 0 dBm and is 180 degrees out of phase with the test audio signal. If the phase of the combined audio signal with respect to the test audio signal is within a second predetermined range, the signal analyzer 134 determines that a tip-ring short circuit exists in the subscriber premise network 122. For example, if the amplitude of the combined audio signal is between −0.2 and 0.2 dBm, and the phase with respect to the test audio signal is between −170 degrees and −190 degrees, the signal analyzer 134 determines that a tip-ring short exists within the subscriber premise network 122.

The wiring test continues by taking at least one of the telephones 124 off-hook. If there is no fault in the subscriber premise network 122 and a telephone 124 is off-hook, the reflected signal is equal to the test audio signal and the combined audio signal is small. The signal analyzer 134 determines that no fault exists if the amplitude of the digital combined audio signal is less than a predetermined threshold. For example, if the amplitude is more than 6dB below the test audio signal, the signal analyzer 134 determines that no fault exists in the subscriber premise network 122.

If an open circuit fault exists in the subscriber premise network 122, the reflected signal has an amplitude of zero volts (no signal). The combined audio signal is in phase with the received audio signal and has an amplitude of 0 dBm. The combined audio signal is converted, transmitted and received at the primary station 102 as described above. The signal analyzer 134 determines that an open circuit fault exists in the subscriber premise network 122 if the combined audio signal has an amplitude and phase within a predetermined range. For example, if the digital combined audio signal has an amplitude between −0.2 dBm and 0.2 dBm and a phase between −10 degrees and 10 degrees in relation the test audio signal, the signal analyzer 134 determines that an open circuit fault exists in the subscriber premise network 122.

In an alternate embodiment, the signal generator 132 and the signal analyzer 134 are located at the subscriber loop 130. The subscriber loop 130 is tested as described above except that the digital combined audio signal is not transmitted over the hybrid fiber/coaxial network 110 and no phase initialization procedure is performed. The phase initialization procedure is not required since no additional delay will be introduced into the phase measurement of the combined audio signal due to a long transmission path through the hybrid fiber/coaxial network 110.

By adding an interface switch 220, complex load 230 and a signal attenuator 232 to the existing circuitry in a line interface circuit 120, various tests can be performed on the subscriber loop quickly, efficiently and inexpensively.

Figure 3:
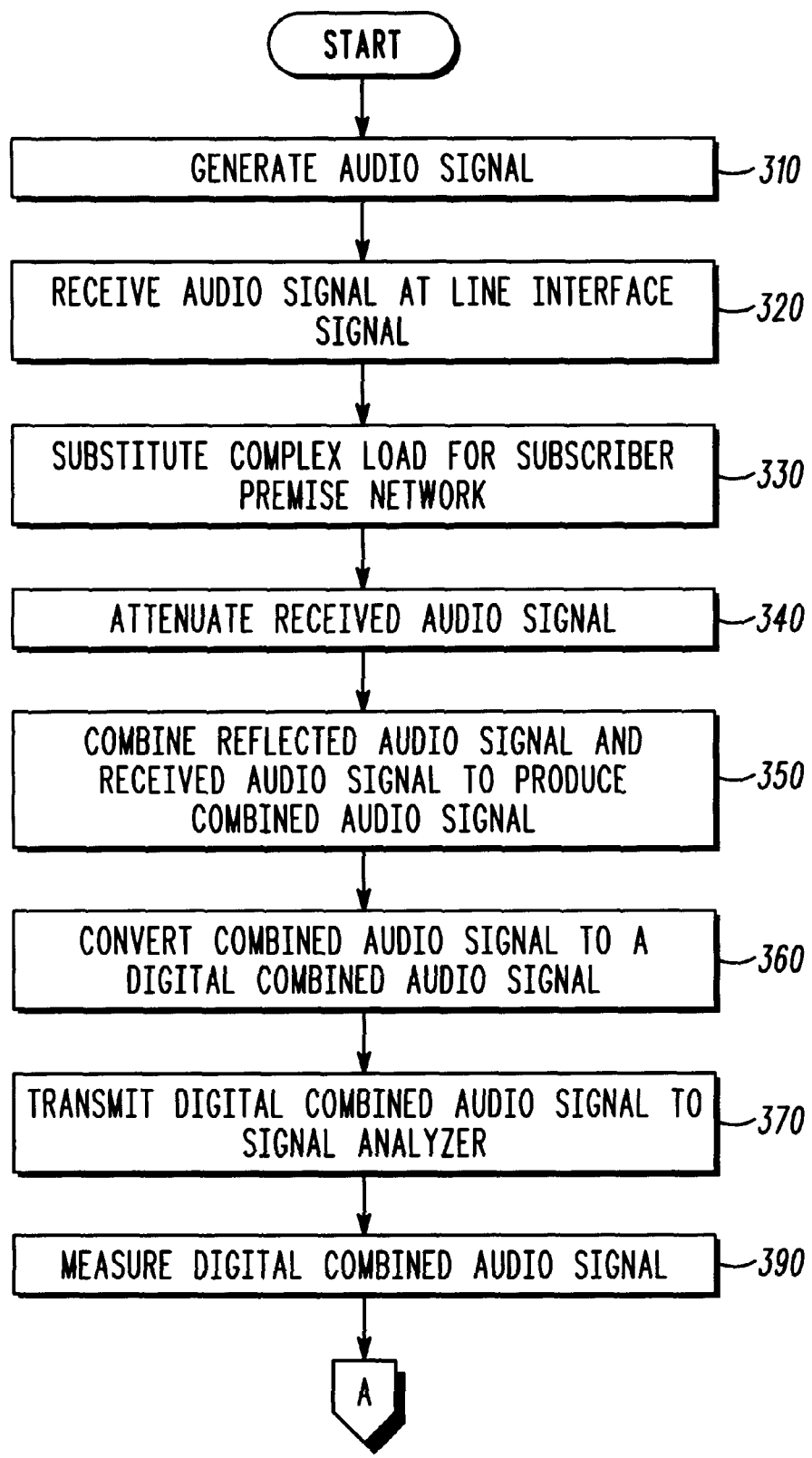
FIG. 3 is a first portion of a flow chart of a method in accordance with the preferred embodiment of the invention.

FIG. 3 is first portion of a flow chart of a method according to the preferred embodiment of the invention. At step 310 an audio signal is generated at the signal generator 132. Preferably, a 1 kHz sinusoidal signal is generated at the signal generator 132 and transmitted to the CAU 112 as discussed above.

A received audio signal is received at the line interface circuit 120 through the transceiver 118 in the CAU 112 that receives the audio signal at step 320.

At step 330, a complex load 230 is substituted for a subscriber premise network 122. As discussed above, a control signal from the controller 135 directs the interface switch 220 to disconnect the subscriber premise network 122 and connect the complex load 230.

The received audio signal is attenuated in an attenuator 232 before coupling to a signal combiner 228 at step 340. In the preferred embodiment, the attenuator 232 is a transistor that is turned on by a control signal from the controller 135 to short the signal to ground.

At step 350, a reflected signal produced at the output of a SLIC 210 is combined with the received audio signal in the signal combiner 228 to produce a combined audio signal.

At step 360, the combined audio signal is converted to a digital combined audio signal as discussed above.

The digital combined audio signal is transmitted to a signal analyzer 134 through the hybrid fiber/coaxial cable network 110 and the CIC 103 at step 370.

At step 390, the signal analyzer 134 measures the combined audio signal by measuring the digital combined audio signal.

Figure 4:
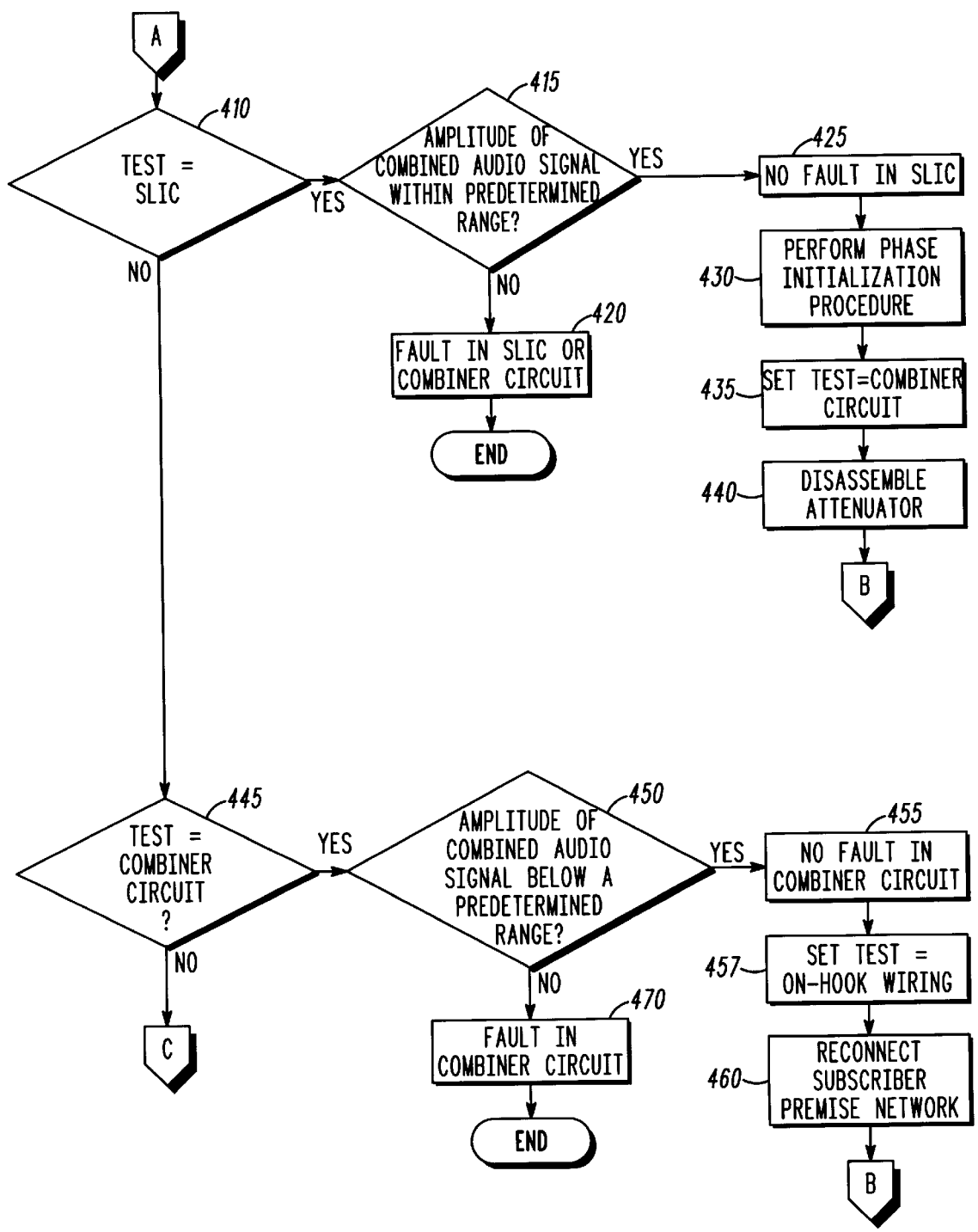
FIG. 4 is a second portion of a flow chart of a method in accordance with the preferred embodiment of the invention.

FIG. 4 is a second portion of the flow chart of a method according to the preferred embodiment of the invention. The method continues at step 415 at FIG. 4.

At step 415 the signal analyzer 134 determines if the amplitude of the combined audio signal is within a predetermined range. As discussed above, the predetermined amplitude range in the preferred embodiment is between −0.2 and 0.2 dBm. If the combined audio signal is within the predetermined range, the method proceeds to step 425. Otherwise, the method continues at step 420.

At step 420, the signal analyzer 134 indicates to the controller 113 that a fault exists in the SLIC 210.

At step 425, the signal analyzer 134 indicates to the controller 113 that no faults exist in the SLIC 210.

At step 430, the signal analyzer 134 performs a phase initialization procedure. The signal analyzer 134 measures a phase of the combined audio signal with respect to the test audio signal and stores a phase offset value as discussed above.

Figure 5:
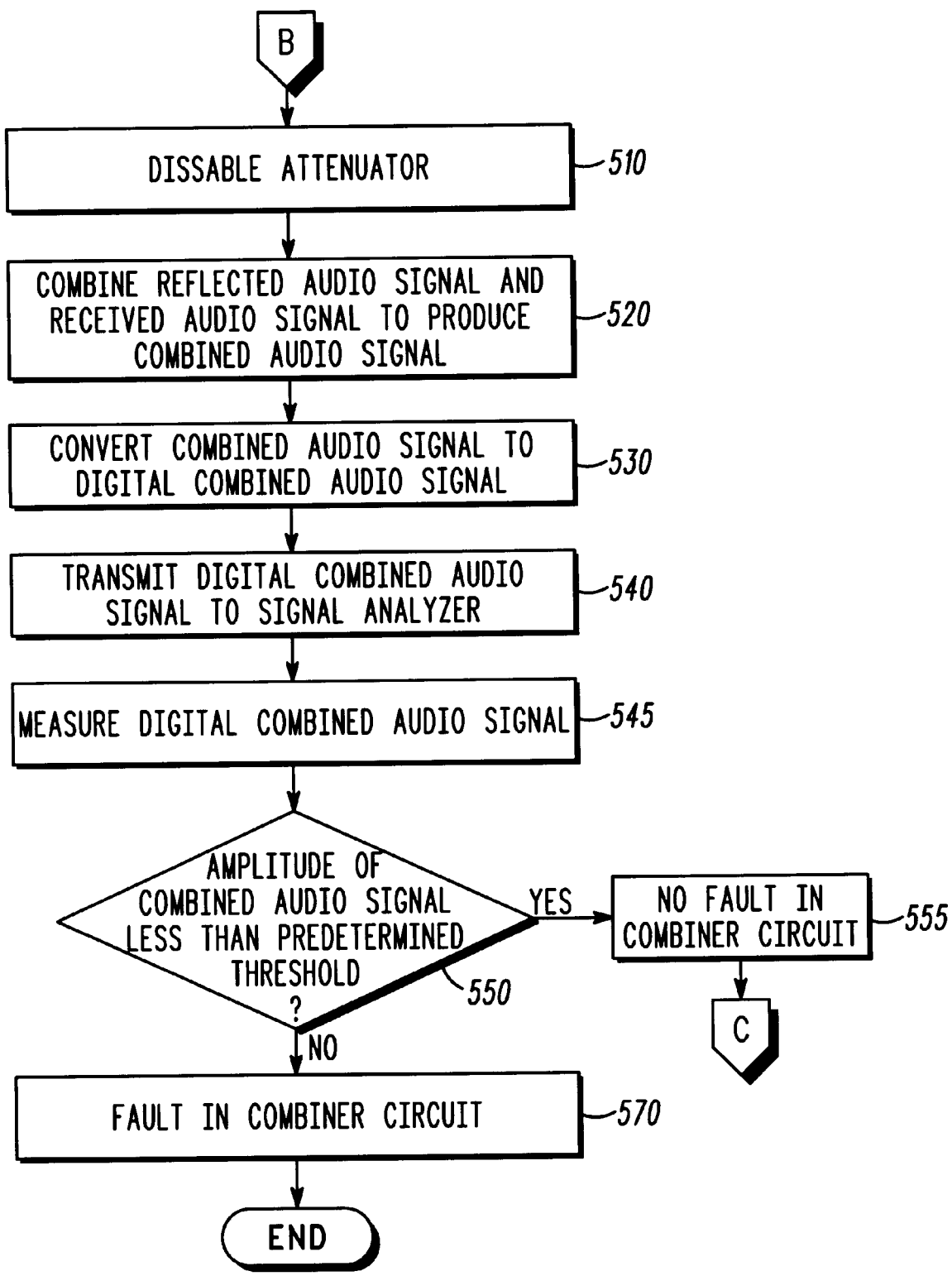
FIG. 5 is a third portion of a flow chart of a method in accordance with the preferred embodiment of the invention.

FIG. 5 is a third portion of the flow chart of a method according to the preferred embodiment of the invention. The method continues at step 510 at FIG. 5.

At step 510 the attenuator is disabled by the controller 135 in order to begin a combiner circuit test. A command signal is sent from the CIC 103 through the CAU to the controller 135 directing the controller 135 to turn off the attenuator 232.

After the controller 135 disables the signal attenuator 232, the method continues at step 520. Steps 520 through 545 are performed as described above in reference to step 350 through step 390 for the received audio signal and the reflected audio signal obtained in the combiner circuit test conditions.

At step 550, the signal analyzer 134 determines if the amplitude of the combined audio signal is below a predetermined threshold by measuring the digital combined audio signal. Preferably, the threshold is −40 dBm. If the amplitude of the combined audio signal is not below the predetermined threshold, the method proceeds to 570. Otherwise the method continues at step 555.

At step 570, the signal analyzer 134 indicates to the CIC 103 that a fault exists in the combiner circuit 204.

At step 555, the signal analyzer 134 indicates to the CIC 103 that no fault exists in the combiner circuit 204.

Figure 6:
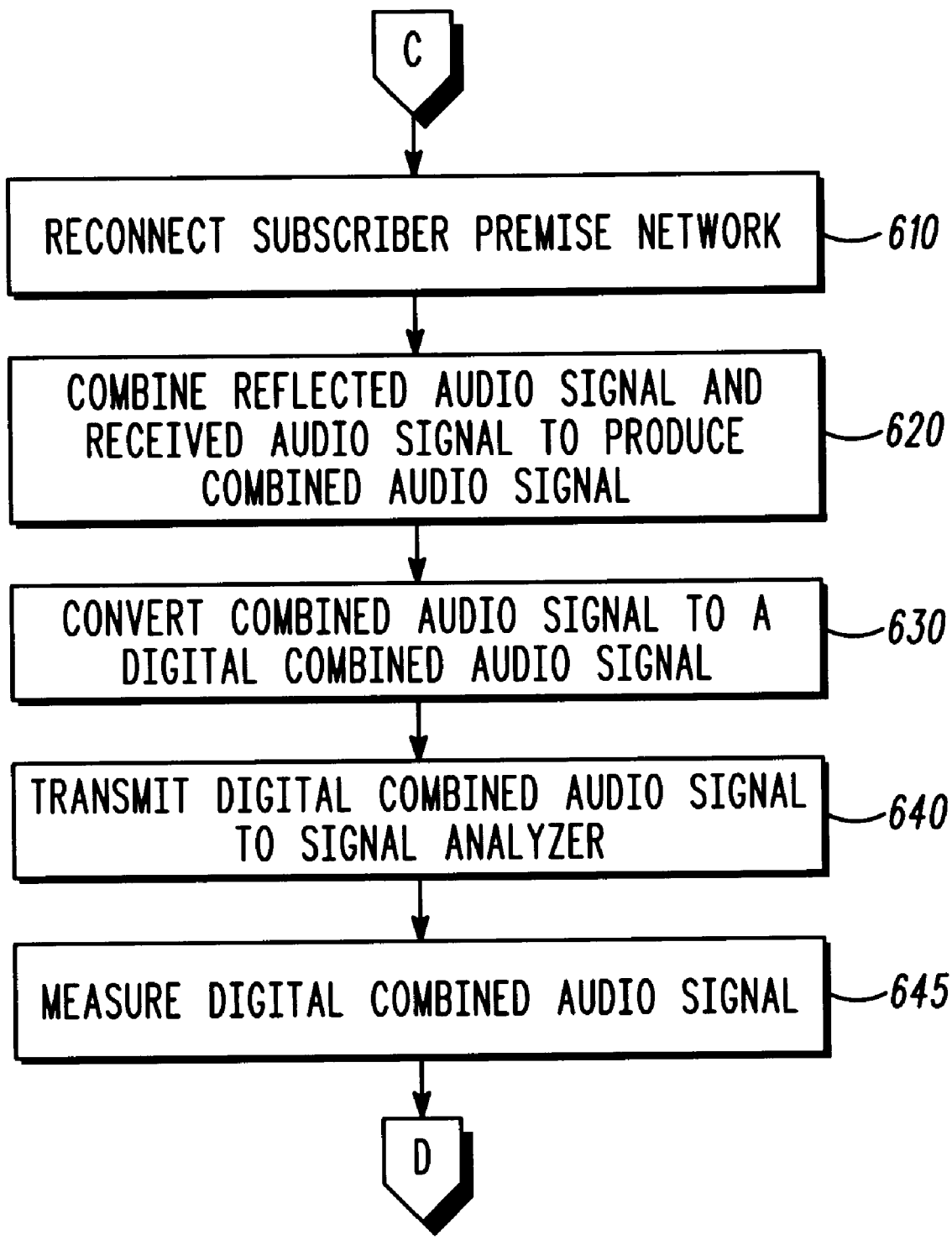
FIG. 6 is a fourth portion of a flow chart of a method in accordance with the preferred embodiment of the invention.

FIG. 6 is a fourth portion of the flow chart of a method according to the preferred embodiment of the invention. The method continues at step 610 at FIG. 6.

At step 610, the subscriber premise network 122 is reconnected to the tip-ring port 214 through the interface switch 220. The controller 135 directs the interface switch to connect the subscriber premise network 122 and disconnect the complex load 230 as directed by a control signal sent from the controller 113 in order to perform the wiring test.

Steps 620 through 645 are performed as described above in reference to step 350 through step 390 for the received audio signal and the reflected audio signal obtained in the wiring test.

Figure 7:
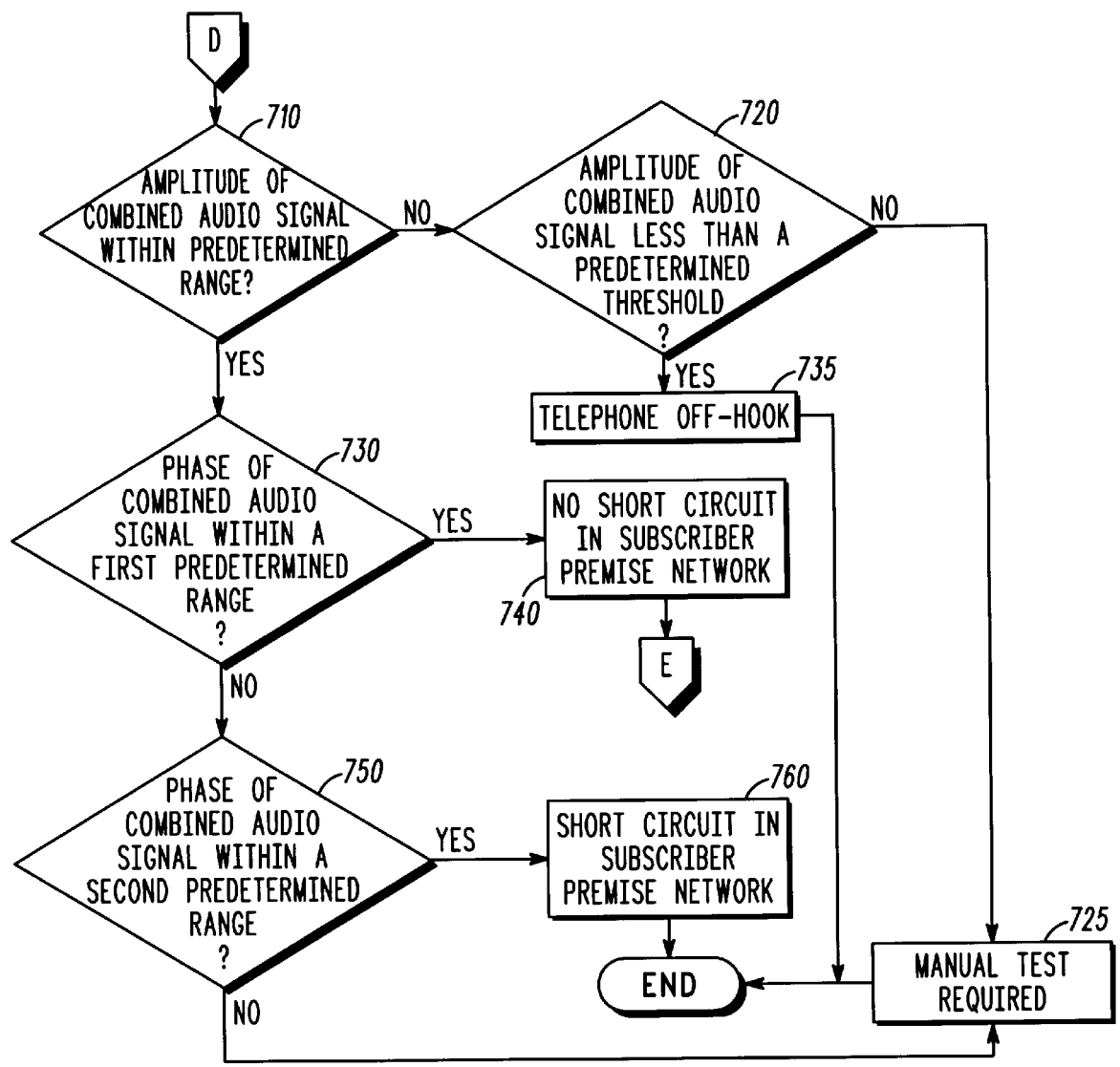
FIG. 7 is a fifth portion of a flow chart of a method in accordance with the preferred embodiment of the invention.

FIG. 7 is fifth portion of the flow chart of a method according to the preferred embodiment of the invention.

At step 710 the signal analyzer 134 determines if the amplitude of the combined audio signal is within a predetermined range by measuring the digital combined audio signal. Preferably, the predetermined range for the amplitude of the combined audio signal is −0.2 dBm to 0.2 dBm. If the amplitude is within the predetermined range, the method continues at step 730. Otherwise, the method proceeds to step 720.

At step 720, the signal analyzer 134 determines if the amplitude of the combined audio signal is less than a predetermined threshold. Preferably, the predetermined threshold is −6 dBm. If the amplitude is less than −6 dBm the method proceeds to step 735. Otherwise the method continues at step 725.

At step 735, the signal analyzer 134 indicates to the controller 135 that a telephone 124 is off-hook.

At step 725 the signal analyzer 134 indicates that a manual test is required to obtain additional diagnostic information.

At step 730, the signal analyzer 134 determines if the phase of the combined audio signal is within a first predetermined range by measuring the digital combined audio signal. Preferably, the first predetermined range is −10 to 10 degrees as compared to test audio signal generated by the signal generator 132. If the signal analyzer 134 determines that the phase of the combined audio signal is within the predetermined range, the method proceeds to step 740. Otherwise, the method continues at step 750.

At step 740, the signal analyzer 134 indicates to the controller 113 that no short circuit exists in the subscriber premise network 122.

At step 750, the signal analyzer 134 determines if the phase of the combined audio signal is within a second predetermined range by measuring the digital combined audio signal. Preferably, the second predetermined range is 170 to 180 degrees as compared to test audio signal generated by the signal generator 132.

If the phase is within the second predetermined range the signal indicates to the controller 113 that a short circuit exists in the subscriber premise network 122 at step 760. Otherwise the method continues at step 725

Figure 8:
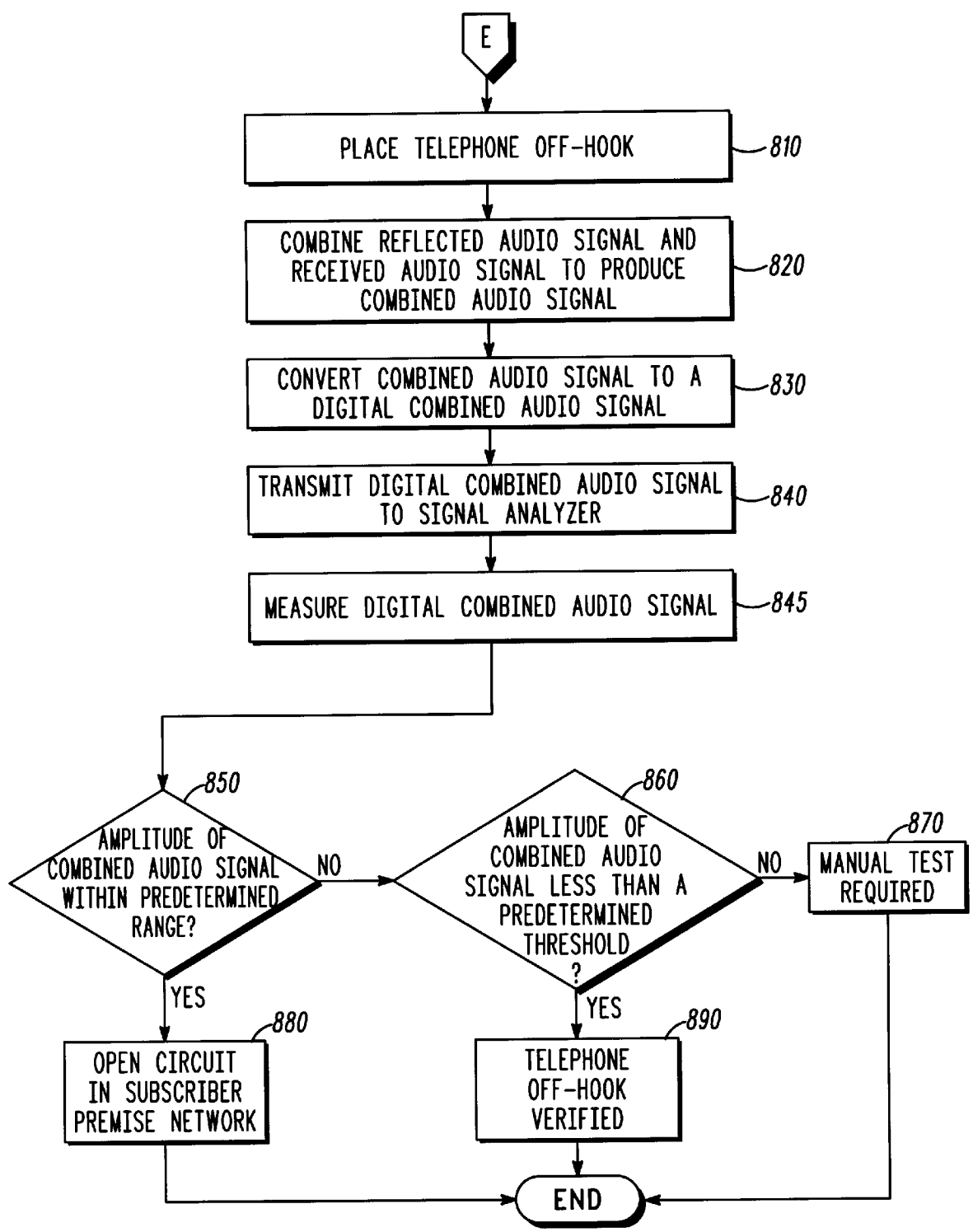
FIG. 8 is a sixth portion of a flow chart of a method in accordance with the preferred embodiment of the invention.

After the signal analyzer 134 indicates to the controller 113 that no short circuit is detected in the subscriber premise network 122 at step 740, the method proceeds to step 810 at FIG. 8. FIG. 8 is a sixth portion of the flow chart of a method according to the preferred embodiment of the invention.

At step 810, at least one telephone 124 in the subscriber premise network 122 is taken off-hook. Preferably, a request is communicated to the subscriber to take the telephone 124 off-hook. For example, an operator may make request over a second telephone line (126) or through a telephone line of a neighboring subscriber premise (106).

With the telephone 124 off-hook, the method continues with the wiring test at step 820. Step 820 through step 845 are performed as described above in reference to step 350 through step 390 with a reflected audio signal and a received audio signal obtained in the wiring test with a telephone 124 off-hook.

At step 850 the signal analyzer 134 determines if the amplitude of the combined audio signal is within a predetermined range by measuring the digital combined audio signal. Preferably, the predetermined range for the amplitude of the combined audio signal is −0.2 dBm to 0.2 dBm. If the amplitude is within the predetermined range, the method continues at step 880. Otherwise, the method proceeds to step 860.

At step 880, the signal analyzer 134 indicates to the controller 113 that an open circuit exists in the subscriber premise network 122.

At step 860, the signal analyzer 134 determines if the amplitude of the combined audio signal is less than a predetermined threshold by measuring the digital combined audio signal. Preferably, the predetermined threshold is −6 dBm.

If the amplitude is less than the predetermined threshold, the method continues at step 890 where the signal analyzer 134 verifies to the controller 113 that a telephone 124 is off-hook and, therefore, the signal analyzer 134 determines that no faults exists in the subscriber loop. Otherwise the method continues at step 870.

At step 870, the signal analyzer 134 indicates to the controller that a manual test is required to obtain additional diagnostic information.

Therefore, by using the method and system of the present invention, a subscriber loop 130, including the subscriber premise network 122 and the line interface circuit 120, can be tested efficiently, quickly and inexpensively.

We claim:

1. A method comprising the steps of:
   receiving an audio signal at a line interface circuit to produce a received audio signal;
   combining the received audio signal with a reflected audio signal to produce a combined audio signal in the line interface circuit; and
   determining if a fault exists in a subscriber loop by measuring the combined audio signal.

2. A method according to claim 1 wherein the step of determining if a fault exists in the subscriber loop includes determining if a fault exists in a subscriber premise network.

3. A method according to claim 1 wherein the reflected audio signal is dependent on an impedance at a tip-ring port of the line interface circuit.

4. A method according to claim 1 wherein the step of receiving an audio signal comprises receiving an audio signal from a primary station.

5. A method according to claim 1 further comprising the step of substituting a complex load for a subscriber premise network.

6. A method according to claim 5 wherein the step of determining if a fault exists in the subscriber premise network includes determining if the combined audio signal has an amplitude less than a predetermined threshold.

7. A method according to claim 1 further comprising the step of attenuating the received audio signal before the received audio signal is combined with the reflected audio signal.

8. A method according to claim 7 wherein the step of determining if a fault exists in a subscriber premise network includes determining if the combined audio signal has an amplitude within a predetermined range.

9. A method according to claim 7 wherein the step of determining if a fault exists in a subscriber premise network includes determining if the combined audio signal has a phase within a predetermined range.

10. A method according to claim 1 further comprising the steps of:
    converting the combined audio signal to a digital combined audio signal;
    transmitting the digital combined audio signal to a signal analyzer; and
    measuring the digital combined audio signal.

11. A method according to claim 10 wherein the step of measuring the digital combined audio signal comprises measuring an amplitude of the digital combined audio signal.

12. A method according to claim 10 wherein the step of measuring the digital combined audio signal comprises measuring a phase of the digital combined audio signal.

13. A method according to claim 10 wherein the step of measuring the digital combined audio signal is performed at a primary station remotely located from the subscriber loop.

14. A method comprising the steps of:
    receiving an audio signal at a line interface circuit from a primary station to produce a received audio signal;
    combining the received audio signal with a reflected audio signal dependent on an impedance at a tip-ring port of the line interface circuit to produce a combined audio signal in the line interface circuit;
    converting the combined audio signal to a digital combined audio signal;
    transmitting the digital combined audio signal to the primary station; and determining if a fault exists in a subscriber loop by measuring the digital combined audio signal at the primary station.

15. A method according to claim 14 further comprising the step of substituting a complex load for a subscriber premise network.

16. A method according to claim 14 wherein the step of measuring the digital combined audio signal comprises measuring an amplitude of the digital combined audio signal.

17. A method according to claim 14 wherein the step of measuring the digital combined audio signal comprises measuring a phase of the digital combined audio signal.

18. A system comprising:
a line interface circuit receiving a received audio signal from a signal generator;
a subscriber premise network coupled to the line interface circuit; and
a signal analyzer coupled to the line interface circuit measuring a combined audio signal to determine if a fault exists in a subscriber loop defined by the subscriber premise network and the line interface circuit, the line interface circuit producing the combined audio signal by combining a reflected audio signal and the received audio signal.

19. A system according to claim 18, the signal analyzer measuring the combined audio signal to determine if a fault exists in the subscriber premise network.

20. A system according to claim 18 wherein the reflected audio signal is dependent on an impedance at a tip-ring port of the line interface circuit.

21. A system according to claim 18 wherein the line interface circuit is coupled to the subscriber premise network through an interface switch, the interface switch substituting a complex load for the subscriber premise network, and the signal analyzer measuring the combined audio signal to determine if a fault exists in the line interface circuit.

22. A system according to claim 18, the line interface circuit including a signal attenuator attenuating the received audio signal.

23. A system according to claim 22, wherein the signal attenuator is a switch.

24. A system according to claim 18 further comprising:
a transceiver coupled between the line interface circuit and a primary station converting the combined audio signal to a digital combined audio signal, the signal analyzer measuring the digital combined audio signal.

25. A system according to claim 24 wherein the transceiver transmits the digital combined audio signal to the primary station, the signal analyzer located at the primary station.

26. A system comprising:
a line interface circuit receiving a received audio signal through a transceiver from a signal generator located at a primary station;
a subscriber premise network coupled to the line interface circuit;
a transceiver coupled between the line interface circuit and the primary station transmitting a digital combined audio signal produced from a combined audio signal to the primary station; and
a signal analyzer at the primary station measuring the digital combined audio signal to determine if a fault exists in a subscriber loop defined by the subscriber premise network and the line interface circuit, the line interface circuit producing the combined audio signal by combining a reflected audio signal and the received audio signal.

27. A system according to claim 26 wherein the line interface circuit includes an interface switch substituting a complex load for the subscriber premise network, the signal analyzer measuring the combined audio signal to determine if a fault exists in the line interface circuit.

28. A system according to claim 26, the line interface circuit including a signal attenuator attenuating the received audio signal.

29. A line interface circuit comprising:
a combiner circuit capable of receiving a received audio signal from a signal generator; and
a subscriber loop interface circuit coupled to the combiner circuit, coupling the received audio signal from the combiner circuit to a tip-ring port of the subscriber loop interface circuit, the subscriber loop interface circuit transmitting a reflected audio signal dependent on an impedance at the tip-ring port to the combiner circuit, the combiner circuit comprising a signal combiner combining the reflected audio signal and the received audio signal to produce a combined audio signal and a signal attenuator coupled to the signal combiner attenuating the received audio signal.

30. A line interface circuit according to claim 29 further comprising an interface switch coupled to the subscriber loop interface circuit substituting a complex load when the line interface circuit is tested.

31. A line interface circuit according to claim 29 wherein the signal attenuator is a switch.

* * * * *